US007192551B2

(12) United States Patent
Sharpe et al.

(10) Patent No.: US 7,192,551 B2
(45) Date of Patent: Mar. 20, 2007

(54) INDUCTIVE HEATING PROCESS CONTROL OF CONTINUOUS CAST METALLIC SHEETS

(75) Inventors: David Sharpe, Chesterfield, VA (US); Firooz Rasouli, Midlothian, VA (US); John F. Cunningham, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 221 days.

(21) Appl. No.: 10/201,933

(22) Filed: Jul. 25, 2002

(65) Prior Publication Data

US 2004/0016478 A1 Jan. 29, 2004

(51) Int. Cl.
*C21D 9/54* (2006.01)

(52) U.S. Cl. .......................................... 266/103; 419/3
(58) Field of Classification Search ............... 266/103; 419/3; 425/78
See application file for complete search history.

(56) References Cited

U.S. PATENT DOCUMENTS

| 2,763,044 | A |   | 9/1956  | Brennan |
| 2,772,454 | A |   | 12/1956 | Brennan |
| 2,838,814 | A |   | 6/1958  | Brennan |
| 2,880,483 | A |   | 4/1959  | Hanks et al. |
| 2,935,402 | A | * | 5/1960  | Trotter et al. ............... 419/28 |
| 3,589,429 | A |   | 6/1971  | Schoffmann |
| 3,883,709 | A | * | 5/1975  | Cole ......................... 218/119 |
| 3,942,090 | A |   | 3/1976  | Matthes et al. |
| 3,958,435 | A | * | 5/1976  | Inoi et al. ..................... 72/8.5 |
| 4,006,016 | A | * | 2/1977  | Zambrow et al. ............. 75/221 |
| 4,042,384 | A | * | 8/1977  | Jackson et al. ............... 419/43 |
| 4,113,166 | A |   | 9/1978  | Olsson |
| 4,121,928 | A | * | 10/1978 | Mori ............................ 419/3 |
| 4,160,891 | A |   | 7/1979  | Scheffler |
| 4,256,165 | A |   | 3/1981  | von Starck et al. |
| 4,263,798 | A | * | 4/1981  | Wladika et al. ............... 72/202 |
| 4,316,376 | A | * | 2/1982  | Masui et al. .................. 72/161 |
| 4,428,778 | A | * | 1/1984  | Masuda et al. ........... 148/11.5 P |
| 4,524,820 | A | * | 6/1985  | Gullotti et al. ............... 164/476 |

(Continued)

FOREIGN PATENT DOCUMENTS

GB          2075065 A  *  11/1981

(Continued)

OTHER PUBLICATIONS

Hans G. Matthes, "Novel Process of Quality Control during Inductive Hardening Process," presentation for CIT/FNA at the Induction Heating Clinic conducted at the Furnace 2000 Trade Show, Orlando, FL, Mar. 29-30, 2000.

*Primary Examiner*—Scott Kastler
(74) *Attorney, Agent, or Firm*—Buchanan Ingersoll & Rooney PC

(57) ABSTRACT

An apparatus for rolling of a powder metallurgical metallic workpiece is provided having a feeding device, a first induction heating apparatus in operable communication with a first RF generator and at least a first hot rolling mill. A process control device monitors at least one parameter of the first RF generator and outputs a signal. A method for continuous rolling of a metallic workpiece is also provided using the apparatus for rolling. The process control device signal can be used to monitor metallurgical properties of the workpiece and provide in-line evaluation of the workpiece.

26 Claims, 2 Drawing Sheets

U.S. PATENT DOCUMENTS

Figure 1:
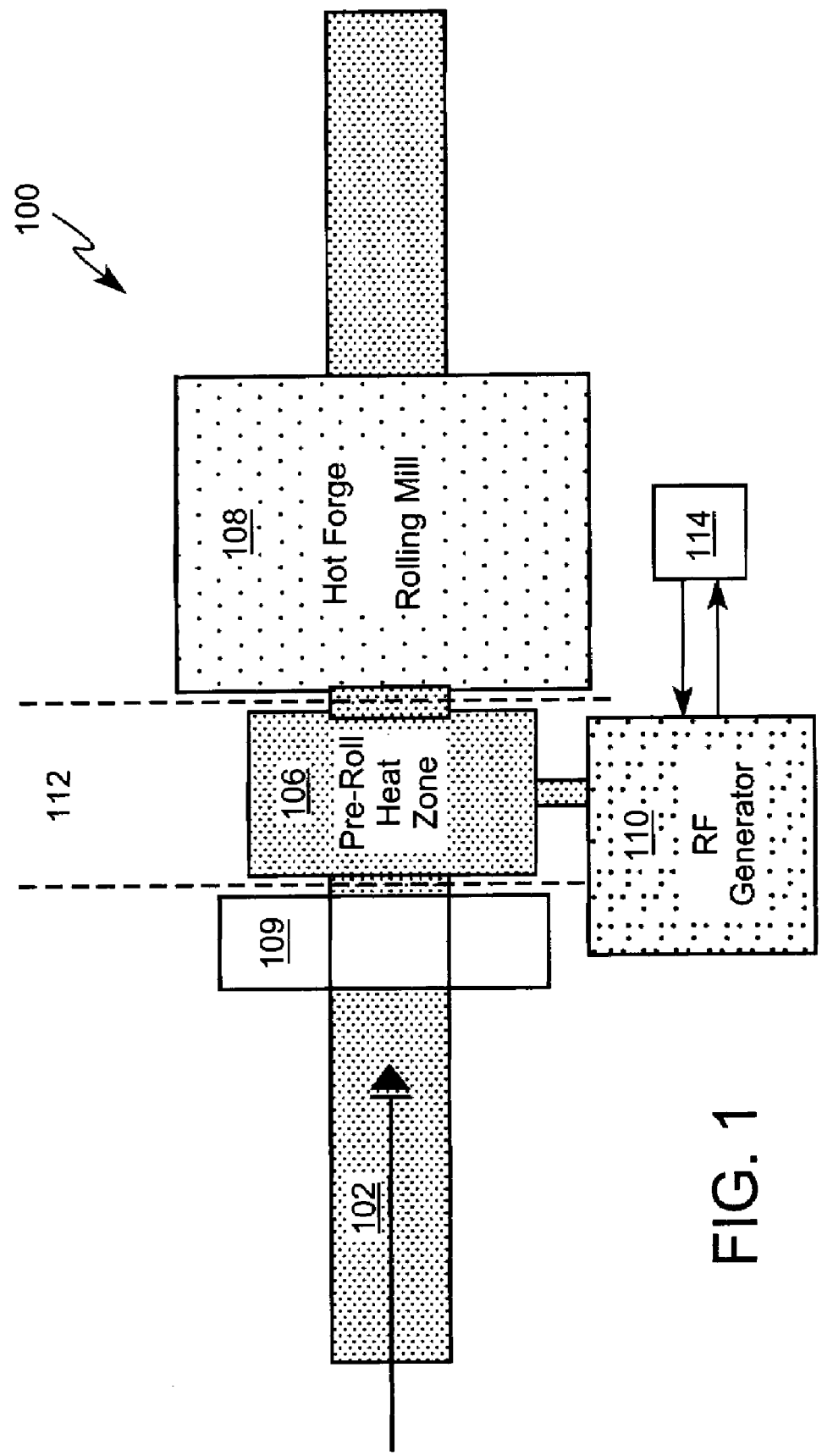

| | | | |
|---|---|---|---|
| 4,617,067 A | | 10/1986 | Gueussier |
| 4,698,897 A | * | 10/1987 | Frommann et al. ......... 29/527.7 |
| 4,706,871 A | * | 11/1987 | Kajiwara et al. ........... 228/158 |
| 4,782,994 A | | 11/1988 | Raybould et al. |
| 4,816,633 A | | 3/1989 | Mucha et al. |
| 4,897,518 A | | 1/1990 | Mucha et al. |
| 4,927,469 A | * | 5/1990 | Rioja et al. ............. 148/11.5 A |
| 4,937,419 A | | 6/1990 | Kolodziej et al. |
| 5,133,205 A | * | 7/1992 | Rostik et al. .................. 72/200 |
| 5,140,118 A | * | 8/1992 | Catanese et al. ............ 219/643 |
| 5,156,800 A | * | 10/1992 | Buchet et al. ................. 266/99 |
| 5,173,246 A | | 12/1992 | Schwarz et al. |
| 5,284,535 A | | 2/1994 | Ueshima et al. |
| 5,330,593 A | | 7/1994 | Stengel |
| 5,365,041 A | | 11/1994 | Shank |
| 5,375,648 A | | 12/1994 | Idogawa et al. |
| 5,613,505 A | | 3/1997 | Campbell et al. |
| 5,630,957 A | | 5/1997 | Adkins et al. |
| 5,634,257 A | * | 6/1997 | Kajiwara et al. ........... 29/527.7 |
| 5,739,506 A | * | 4/1998 | Hanton et al. ............... 219/645 |
| 5,871,138 A | * | 2/1999 | Shishido et al. ............ 228/102 |
| 5,904,204 A | * | 5/1999 | Teraoka et al. .............. 164/417 |
| 6,030,472 A | | 2/2000 | Hajaligol et al. |
| 6,044,895 A | * | 4/2000 | Kuttner et al. ........... 164/155.4 |
| 6,143,241 A | | 11/2000 | Hajaligol et al. |
| 6,166,360 A | | 12/2000 | Ruffini, Sr. et al. |
| 6,259,071 B1 | * | 7/2001 | Demidovitch et al. ...... 219/486 |
| 6,264,765 B1 | * | 7/2001 | Bryant et al. ................ 148/511 |
| 6,312,495 B1 | * | 11/2001 | Renner et al. ................. 75/247 |
| 6,478,899 B1 | * | 11/2002 | Legrand et al. ............. 148/541 |
| 6,533,876 B1 | * | 3/2003 | Cornelissen et al. ........ 148/541 |
| 6,669,789 B1 | * | 12/2003 | Edelman et al. ............ 148/320 |
| 6,763,561 B2 | * | 7/2004 | Sclippa ....................... 29/33 C |
| 2002/0189075 A1 | * | 12/2002 | Sclippa ...................... 29/527.7 |
| 2003/0145920 A1 | * | 8/2003 | Kami et al. ................. 148/651 |

FOREIGN PATENT DOCUMENTS

| | | | |
|---|---|---|---|
| WO | WO 99/28068 | * | 6/1999 |

* cited by examiner

INDUCTIVE HEATING PROCESS CONTROL OF CONTINUOUS CAST METALLIC SHEETS

BACKGROUND

1. Field of the Invention

The invention is directed to the manufacture of metallic products such as sheet, strip, rod, wire or band, especially of difficult to work intermetallic alloys like aluminides of iron, nickel and titanium. Particularly, the invention is directed to a hot rolling operation utilizing an inductive heating processing step and associated process control feedback.

2. Background of the Invention

In the description of the background of the present invention that follows, reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Powder metallurgical processes for preparing sheets from a powder having an intermetallic alloy composition such as an iron, nickel or titanium aluminide, are disclosed in commonly owned U.S. Pat. No. 6,030,472, the contents of which are herein incorporated by reference. In such processes, non-densified metal sheets of aluminide are consolidated from a powder by roll compaction, tape casting or plasma spraying. A cold rolled sheet is formed by cold rolling the non-densified metal sheet so as to increase the density and reduce the thickness followed by annealing.

U.S. Pat. No. 6,143,241, the contents of which are herein incorporated by reference, discloses a method of manufacturing intermetallic products by a process including cold working and intermediate or final flash annealing.

U.S. Pat. No. 6,166,360, the contents of which are herein incorporated by reference, discloses the use of a combined induction heating and conduction heating process to uniformly heat a part of varying thickness for hot forming and heat treatments such as hardening and tempering.

U.S. Pat. No. 4,782,994, the contents of which are herein incorporated by reference, discloses an apparatus for inline annealing of strip material including a hot press followed by a plate annealer and a field annealing process. A computerized control means provides signals for a strip feeding rate, temperature and pressure of the heated pressure rolls, temperature of the separate inline annealer, and tension on the strip.

Iron aluminides generally require multiple pass rolling operations during which a sheet stock is reduced in thickness. The capital investment required to assemble a rolling line for iron aluminide is substantial. Currently, aluminide stock is processed in a multiple roll rolling line having up to sixty or more rolling operations. For instance, product that has undergone multiple rolling steps is removed from the in-line process and tested off-line. Testing techniques may be non-destructive (i.e., ultrasonic examination) or may be destructive evaluation processes (i.e., sectioning and polishing for microscopic or visual examination). Thus, metallurgical evaluation is made as to the acceptability of the final work product only after completion of the value added processing steps.

Therefore, there is a need to provide a rolling operation for aluminide materials, particularly sheet stock, that reduces the capital investment and provides for inline process monitoring and feedback. Further, there is a need to minimize the number of required passes in a rolling operation for aluminide stock material.

SUMMARY OF THE INVENTION

It is an object of the present invention to minimize the number of rolling steps required to reduce a workpiece by a minimum of 50% of its thickness.

It is a further object of the present invention to provide a hot rolling line for the reduction of aluminide metallic stock.

An additional object of the present invention is to provide inline monitoring and feedback capability of final product metallurgical properties.

An apparatus for rolling of a metallic workpiece is provided having a feeding device operable to convey the workpiece along the process line, a first induction heating apparatus in operable communication with a first RF generator and operable to heat the workpiece during movement along the process line, at least a first hot rolling mill and a process control device operable to monitor at least one parameter of the first FR generator. An optional second hot rolling mill with associated induction heating apparatus and RF generator can be included. A heating device in thermal communication with one or more surfaces of a roll of the first and/or second hot rolling mill can maintain the surface of the roll at a second temperature. Also, optionally, at least one cold rolling mill can be located downstream of a last hot rolling mill followed by a post-roll annealing apparatus having an annealing induction heating apparatus in operable communication with an annealing RF generator.

A method for continuous rolling of a metallic workpiece is provided using the apparatus for rolling and having the steps of feeding the workpiece at a first speed into a process line, heating the workpiece during movement along the process line to a first temperature in at least a first inductive heating apparatus in operable communication with a first RF generator, monitoring at least one parameter of the first RF generator, and hot rolling the workpiece in at least a first hot rolling mill operating at a second speed. Multiple hot rolling operations can optionally be used followed by cold rolling and/or annealing. The resulting workpiece can have a density greater than 95%.

BRIEF DESCRIPTION OF THE DRAWING FIGURES

Figure 2:
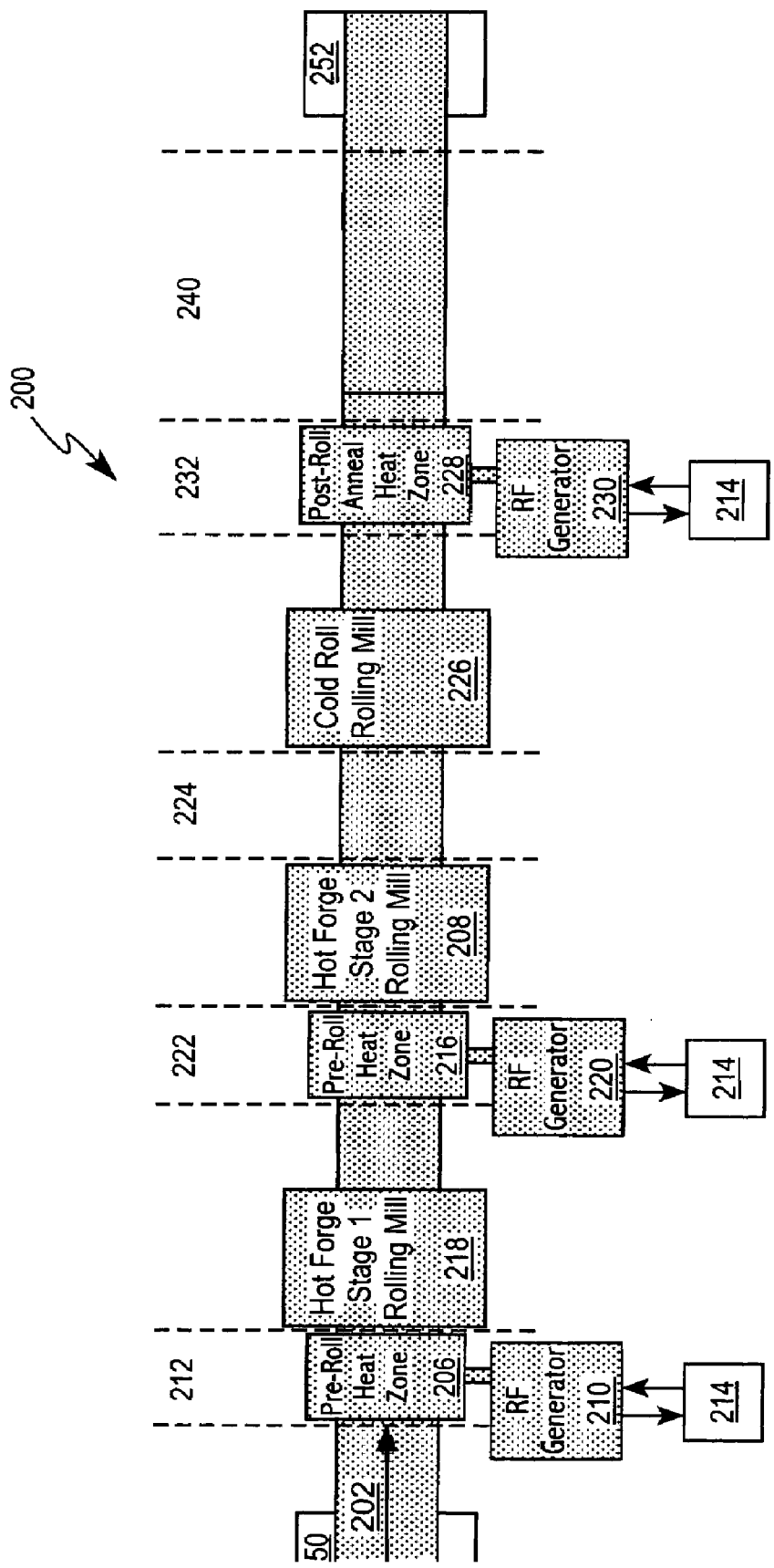

Other objects and advantages of the invention will become apparent from the following detailed description of preferred embodiments in connection with the accompanying drawings in which like numerals designate like elements and in which:

FIG. 1 is a schematic illustration of a first embodiment of an aluminide hot rolling line layout; and FIG. 2 is a schematic illustration of a second embodiment of an aluminide hot rolling line layout.

DETAILED DESCRIPTION OF THE PREFERRED EMBODIMENTS

FIG. 1 is a schematic illustration of an embodiment of the layout of a hot rolling line 100 for the processing of an aluminide workpiece 102. A workpiece 102, such as sheet stock, can be fed into a feeding device 104 which outputs to a first induction heating apparatus 106. The heated workpiece 102 is then fed into a first hot rolling mill 108 for reduction in thickness. A first RF generator 110 in operable communication with the first induction heating apparatus 106 substantially constitutes a first induction heating zone 112.

The feeding device 104 can be any suitable device that can maintain the desired tension and lateral alignment on the workpiece 102. Alternatively, the feeding device 104 can be eliminated and a suitable feeding means can be employed to achieve the desired tension and lateral alignment, for example by a continuous feeding operation conducted from a tensioned bobbin. In a preferred embodiment, the feeding device 104 can be a pinch roll that operates at a first speed that is slower than a second speed at which the hot rolling mill 108 operates, thereby maintaining the workpiece 102 in tension through the induction heating zone 112. A suitable first speed is approximately 30 ft/sec. Additionally, the pinch roll can contribute to the lateral positioning of the workpiece 102 as it is fed into the induction heating zone 112.

Typical temperatures maintained inside the induction heating zone 112 are sufficient to raise the temperature of a workpiece 102 above a recrystallization temperature. For example, for iron aluminide, temperatures are maintained between 700–1100° C. This value represents a 10–20% over capacity for the anticipated power requirement for a 12" wide, 26 mils thick iron aluminide workpiece at 80% density. A preferable value for workpiece temperature is from 700–1000° C.

Aluminides, including iron aluminides, can react with oxygen to form oxides. This is more prevalent at elevated temperatures that can increase the reactivity of the aluminide and make the reaction more facile. Thus, for example, cold rolling methods can help to mitigate the reactivity of aluminides compared to hot rolling methods. Additional mitigating techniques include the use of inert atmospheres or vacuum processes during operations at elevated temperatures. In the exemplary hot rolling line depicted in FIG. 1, an inert atmosphere can be maintained in the induction heating zone 112. Optionally, the same or similar techniques to reduce the oxygen content can be used not only in the induction heating zone 112, but also during any operation conducted at elevated temperatures, such as hot rolling and/or annealing.

In the hot rolling mill 108, the workpiece is reduced approximately 50% in a single pass. The hot rolling mill 108 can be a 2 high or 4 high rolling mill, as is known in the art. Optionally, the hot rolling mill 108 can be preheated to a temperature high enough to preheat the roll and low enough not to damage the roller's packing material and the drive. A suitable temperature is between 300° C. and 700° C. High preheating temperature can be tolerated if required, by using non-conventional rollers and/or using coolant to cool the drives. The preheating of one or more roll surfaces results in a reduced thermal driving force for cooling during the rolling operation.

Any suitable means of heating the roller surface can be used. For example, an IR heating lamp can be placed in thermal communication with the roller surfaces at a position not to interfere with the rolling operation. One particular position can be at an opposite end of a diameter of the rolling surface from where the rolling surface meets the workpiece. Additional heating means include inductive heating and/or a hybrid of inductive and IR heating.

The workpiece 102 can be any suitable metallic workpiece. For example, a metallic workpiece can be a binary compound or alloy of an aluminide of iron, titanium, or nickel. Preferably, the metallic workpiece is an aluminide of at least 75% density, and preferably greater than 80% density. Examples of suitable iron aluminides can be found in U.S. Pat. No. 6,030,472, the contents of which are herein incorporated by reference.

The workpiece may be in the form of a continuous strip or a batch strip. For example, sheet stock formed in a compaction operation with a binder may be formed into a semi-dense sheet and, after the binder is removed by, for example, heating in an oven up to approximately 600° C., can be cold compacted or cold rolled to a sheet having a desired maximum thickness and minimum density. In one example, the metallic workpiece is an iron aluminide sheet stock that is 12" wide having a thickness of 26 mils and a density of 80%. This metallic workpiece can be cut into strips for a batch process or may be fed continuously into the pinch roller.

FIG. 2 is a schematic illustration of an embodiment of the layout of a hot rolling line 200 utilizing at least one hot rolling operation with the addition of a cold rolling operation and a post-rolling annealing operation. A workpiece 202, such as sheet stock, can be fed into a first induction heating apparatus 206. The heated workpiece 202 is then fed into a first hot rolling mill 208 for reduction in thickness. A first RF generator 210 in operable communication with the first induction heating apparatus 206 substantially constitutes a first induction heating zone 212.

Optional, multiple hot rolling operations can be used in the hot rolling line 200. In the exemplary embodiment of FIG. 2, the workpiece that has made one pass through the first hot rolling mill 208 can be fed into a second induction heating apparatus 216. The heated workpiece 202 is then fed into a second hot rolling mill 218 for reduction in thickness. A second RF generator 220 in operable communication with the second induction heating apparatus 216 substantially constitutes a second induction heating zone 222. It should be understood that any number of hot rolling mills with associated induction heating zones can be utilized to obtain a desired reduction in thickness of a workpiece.

A cooling zone 224 positioned after the last hot rolling mill allows the workpiece 202 conveyed by the hot rolling line 200 to cool to a suitable temperature for subsequent handling, such as being taken up by a receiving bobbin 252, or optional cold working operations and/or annealing. In the embodiment shown in FIG. 2, the hot rolling operations are performed sequentially. After all hot rolling operations are completed, an optional cold rolling operation can be performed followed by a post-roll annealing operation. A cold rolling mill 226 can cold work the workpiece 202 to further reduce the thickness, provide a desired surface finish, provide a particular stress, or effect a crystallographic change, such as grain size refinement.

Annealing can be performed in an annealing induction apparatus 228 in operable communication with an annealing RF generator 230 and that substantially constitutes an induction annealing zone 232. The annealing operation is optional and can be used to obtain a desired property in the workpiece, such as a surface finish or reduction in internal stresses. If annealing is performed as a finishing operation, a cooling zone 240 allows the workpiece 202 conveyed by the hot rolling line 200 to cool to a suitable temperature for subsequent handling, such as being taken up by a receiving bobbin 252.

Alternatively, any number of hot rolling operations can be interspersed with any number of cold rolling operations and/or post roll annealing operations to provide the desired workpiece properties including thickness, surface finish, crystal structure, and internal stresses.

The workpiece 202 of the hot rolling line can be a feed stock stored and/or transported on a supply bobbin 250 and which is unwound and fed into the first induction heating zone 212. The supply bobbin 250, in combination with the feed rate and the first hot rolling mill 208, can provide the feeding means to maintain the workpiece 202 in tension at least through the first induction heating zone 212 and to provide lateral alignment of the workpiece.

Alternative continuous feeding operations can be used to provide material for the hot rolling line. For example, it should be understood that a continuous feeding operation can also include the use of feeding and compacting equipment directly forming a workpiece that is fed into the hot rolling line. Alternatively, batch operations can be used to supply material to the hot rolling line.

Each subsequent induction heating zone can be co-located with a hot rolling mill to provide additional reductions. For example, a 26 mil 80% dense iron aluminide feedstock can be reduced 50% to approximately 13 mils in a first combination hot rolling mill/induction heating unit similar to that described for the FIG. 1 embodiment of a hot rolling line layout 100. Further reductions to 7 mils while obtaining a density of greater than 95%, and preferably greater than 97%, can occur in a second combination hot rolling mill/induction heating unit similar to that described for the FIG. 2 embodiment of a hot rolling line layout 200. Further, additional inductive heating zones and hot rolling mills may be implemented in a hot rolling line to obtain any desirable final thickness of feedstock.

A cold rolling mill can be utilized as shown in FIG. 2. A cold rolling mill can provide a surface finish to the workpiece. This surface finish can increase the strength and yield of the workpiece. Generally, cold rolling is followed by a post-roll annealing operation. This step is provided to remove internal stresses and increase the strength and the yield of the workpiece. In FIG. 2, the post roll annealing step is provided by an induction heating apparatus operatively coupled to an RF generator. The principles and purposes of the inductive heating apparatus are similar to those previously discussed. An example of cold working and annealing and the impact upon aluminide sheets is presented and discussed in commonly owned U.S. Pat. No. 6,143,241, the contents of which are herein incorporated by reference.

The induction heating apparatus can be built to a size and shape to accommodate the shape of the workpiece or a portion of the workpiece to be heated. The induction heating apparatus has an inductor which can be a simple coil or several heaters or coils connected and automated to provide a continuous supply of heated stock exiting the induction heating zone. Electric current in the inductor is carried by water cooled copper tubing from an RF generator. The copper inductor is insulated from the workpiece by refractory material or by fitted brickwork. Preferably, the RF generator and the inductor are placed near each other to minimize current losses.

Two modes are available in induction heating. A first mode is called longitudinal heating (or solenoid heating). In longitudinal heating, a coiled inductor tube is formed as a helix into which a workpiece may be passed such that the coiled tube spirals around the workpiece. This geometry can produce a very uniform temperature distribution and can heat the workpiece from the center.

A second mode of induction heating is called transverse flux heating (TFX). In transverse flux heating, a planar coiled tube is used to form the magnetic field. The magnetic field is planar with a Gaussian distribution; therefore, it is not as uniform as the field form in longitudinal heating. This can adversely impact the distribution at the edges of a workpiece and can lead to non-uniform heating. However, appropriately positioned susceptors can modify the magnetic field to form a more Gaussian distribution centered on the center line of the workpiece.

The selection of a particular inductive heating mode can be made by balancing power requirements with cost considerations. Longitudinal heating can be more expensive and generally operates at higher powers translating to higher operating costs. Additionally, workpiece geometry can influence the selection of an inductive heating mode. For example, a sheet geometry can be more appropriately heated in a TFX mode and a tube or rod or wire can be more appropriately heated in a longitudinal heating mode.

The RF generator associated with the induction heating apparatus provides power at a particular frequency to effect the inductive heating process. Both power and frequency can vary in proportion to certain properties of a metal workpiece within the inductive heating apparatus as inferred from the permeability of the workpiece. Methods in which inductive heating parameters are monitored are disclosed in U.S. Pat. No. 4,816,633, U.S. Pat. No. 4,897,518, and U.S. Pat. No. 5,630,957, the disclosures of which are herein incorporated by reference.

Hans G. Matthes, *Novel Process of Quality Control During Inductive Hardening Process*, presentation for CIT/FNA at the Induction Heating Clinic conducted at the Furnace 2000 Trade Show, Orlando, Fla., Mar. 29–30, 2000, the contents of which are herein incorporated by reference, presents a discussion on the use of an integrated process monitoring device with a RF generator of an inductive heating apparatus. In the induction heating process, the induced effective power ($P_w$) and the frequency (f) can be monitored in an on-line process and the values compared to stored predetermined values associated with and developed for a particular heating regime of a workpiece. A process controller can make a binary decision as to whether or not the workpiece is within the established metallurgical standards determined to be acceptable by the operator and stored by the controller.

Comparison of monitored and stored values can be effective in determining metallurgical characteristic properties of the workpiece being heated as well as can be related to physical defects and abnormalities in the workpiece. For example, the relationship between $P_w$ and effective power $P_{eff}$ can be related to delamination arising in the induction heating apparatus, change in diameter and/or size of a workpiece, eccentricity, surface cracking, and other material characteristics that can be inferred from changes in permeability of a workpiece.

Process monitoring can be used in conjunction with any inductive heating operation of a hot rolling line. For example, in FIG. 1, the first RF generator 110 in operable communication with the first induction heating zone 112 can have inductive heating parameters, such as $P_{eff}$ and f, monitored by a process monitor 114. The results from the monitoring can be used to evaluate the properties of the workpiece on-line. A workpiece or section of a workpiece that is determined to not have the desired properties can then be marked for non-use, such as recycling, scrap, or further evaluation, without disrupting the hot rolling operations. Alternatively, other suitable steps can be initiated in response to a workpiece not having the desired properties, such as feedback to the forming process or initiation of a reject operation.

In FIG. 2, the process monitoring capability can be used in conjunction with any inductive heating operation of the hot rolling line 200 including monitoring inductive heating parameters, such as $P_{eff}$ and f, by a process monitor 214 that can be associated with the RF generator of, for example, the inductive heating zones 212, 220. Each induction heating zone in the process can have an associated process monitor. Alternatively, at least one and optionally, any desired number of induction heating zones has an associated process monitoring capability with a process monitor. Further, the process monitoring of the RF generator in the post-roll annealing environment can be further used to evaluate workpiece quality and provide feedback to the operator and to the process.

An additional monitoring technique for the inductive heating zone utilizes surface temperature of the workpiece. Since the power input into the inductive heating zone is calibrated to raise the temperature to a programed value in a predetermined geometrically shaped workpiece, a variation in workpiece geometry in excess of acceptable manufacturing tolerances can result in deviation from the programmed temperature. For example, if a sheet workpiece is not square, that is, one edge is thicker than a second edge, then the thicker edge can be cooler than the thinner edge for a given thermal input. This comparison assumes that the inductive heating apparatus outputs a constant thermal energy. Similarly, a material that is bowed may have areas of its surface that are hotter or cooler than the programmed temperature. Therefore, a sensor equipped to determine thermal profiling can be used to monitor temperature variations on the surface of the workpiece. An example of such a monitor is an IR thermal camera. A suitable temperature differential from edge to edge of a workpiece is approximately 25–50° C. at 1000° C. The IR temperature sensing can be used in any combination of inductive heating zones or the hot rolling line 100, 200.

The temperature provided to the workpiece in the induction heating zone provides for easier working of the workpiece during the hot roll process. Additionally, preheating of the hot roll surfaces reinforces the preheating step by minimizing heat loss to the rollers. An adequate temperature to the workpiece can promote plastic deformation in the workpiece during subsequent rolling operations rather than embrittlement, cracking, or other non-desired deformation processes. For example, in a dislocation controlled deformation process, increased temperature results in increased mobility of defects. Increased mobility of defects results in a reduction in the yield stress required to deform the workpiece. Similarly, if the temperature in the inductive heating zone is adequate to cause flowing of the material, then a concomitant decrease in the yield stress may result.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. An apparatus for rolling of a powder metallurgical aluminide workpiece comprising:
    a pinch roller or a tensioned bobbin operable to convey the powder metallurgical aluminide workpiece under tension along a process line;
    a first induction heating apparatus downstream of the pinch roller or the tensioned bobbin, the first induction heating apparatus in operable communication with a first RF generator and operable to heat the workpiece during movement along the process line;
    at least a first hot rolling mill operable to hot roll the workpiece during movement along the process line; and
    a process control device operable to monitor at least one parameter of the first RF generator and to compare a monitored value of the parameter to a stored value of the parameter so as to determine metallurgical characteristic properties of the workpiece, physical defects in the workpiece and/or abnormalities in the workpiece.

2. The apparatus of claim 1, wherein the first induction heating apparatus comprises an induction heating furnace utilizing transverse flux heating.

3. The apparatus of claim 1, which comprises the pinch roller.

4. The apparatus of claim 3, wherein the process control device is operable to control the pinch roller so as to maintain the workpiece under tension between the pinch roller and the first hot rolling mill.

5. The apparatus of claim 3, wherein the pinch roller feeds the workpiece at approximately 30 ft/sec.

6. The apparatus of claim 1, wherein a reduction in the first hot rolling mill is at least 50%.

7. The apparatus of claim 1, wherein the process control device monitors power or frequency.

8. The apparatus of claim 1, further comprising a temperature sensor that monitors a surface temperature of the metallic workpiece.

9. The apparatus of claim 1, further comprising:
    a heating device in thermal communication with the surface of at least one roller of the first hot rolling mill.

10. The apparatus of claim 9, wherein the heating device is an IR lamp, an inductive heater, or hybrid heater.

11. The apparatus of claim 1, further comprising:
    a second induction heating apparatus located downstream of the first hot rolling mill and in operable communication with a second RF generator; and
    a second hot rolling mill located downstream of the second induction heating apparatus.

12. The apparatus of claim 11, further comprising:
    a heating device in thermal communication with the surface of at least one roller of the second hot rolling mill.

13. The apparatus of claim 12, wherein the heating device is an IR lamp, an inductive heater, or hybrid heater.

14. The apparatus of claim 1, wherein the first induction heating apparatus and the first hot rolling mill are located in an enclosure which maintains an inert atmosphere around the workpiece.

15. The apparatus of claim 1, further comprising:
    at least one cold rolling mill positioned downstream of the first hot rolling mill.

16. The apparatus of claim 1, further comprising:
    at least one cold rolling mill positioned downstream of the first hot rolling mill; and
    an annealing apparatus positioned downstream of the cold rolling mill, the annealing apparatus comprising an annealing induction heating apparatus in operable communication with an annealing RF generator.

17. The apparatus of claim 1, wherein the workpiece is a continuous strip.

18. The apparatus of claim 1, wherein the process control device is adapted to initiate a reject operation in response to at least a section of the workpiece being determined to not have the desired metallurgical characteristic properties.

19. The apparatus of claim 1, wherein the process control device is adapted to provide feedback to the RF generator in response to the workpiece being determined to not have the desired metallurgical characteristic properties.

20. The apparatus of claim 1, wherein the workpiece is a batch strip.

21. The apparatus of claim 20, which comprises the tensioned bobbin.

22. The apparatus of claim 1, wherein the pinch roller or the tensioned bobbin is positioned at an upstream end of the process line.

23. The apparatus of claim 22, wherein the hot rolling mill is positioned at a downstream end of the process line.

24. The apparatus of claim 22, which comprises the tensioned bobbin.

25. The apparatus of claim 1, wherein the process control device determines delamination, change in size, eccentricity and/or surface cracking of the workpiece.

26. The apparatus of claim 1, wherein the portion of the process line that is upstream of the first induction heating apparatus consists of the pinch roller or the tensioned bobbin.

* * * * *